(12) United States Patent  
Martinoni et al.

(10) Patent No.: US 8,114,334 B2  
(45) Date of Patent: Feb. 14, 2012

(54) LASER SINTERING PROCESSES USING THERMOPLASTIC COMPOSITIONS

(75) Inventors: Raffaele Martinoni, Wolfhausen (CH); Paul Böhler, Uetikon (CH)

(73) Assignee: Valspar Sourcing, Inc., Minneapolis, MN (US)

( * ) Notice: Subject to any disclaimer, the term of this patent is extended or adjusted under 35 U.S.C. 154(b) by 1219 days.

(21) Appl. No.: 10/569,364

(22) PCT Filed: Aug. 20, 2004

(86) PCT No.: PCT/US2004/027350  
§ 371 (c)(1), (2), (4) Date: Nov. 2, 2006

(87) PCT Pub. No.: WO2005/025839  
PCT Pub. Date: Mar. 24, 2005

(65) Prior Publication Data  
US 2007/0132158 A1 Jun. 14, 2007

Related U.S. Application Data

(60) Provisional application No. 60/501,338, filed on Sep. 8, 2003.

(51) Int. Cl.  
*B29C 35/08* (2006.01)  
*B29C 41/02* (2006.01)

(52) U.S. Cl. .................................................. 264/497
(58) Field of Classification Search .................. 264/497  
See application file for complete search history.

(56) References Cited

U.S. PATENT DOCUMENTS

| 5,342,919 A | 8/1994 | Dickens, Jr. et al. |
| 5,541,277 A | 7/1996 | Mühlfeld et al. |
| 6,110,411 A | 8/2000 | Clausen et al. |
| 6,245,281 B1 | 6/2001 | Scholten et al. |

FOREIGN PATENT DOCUMENTS

| EP | 0911142 | 4/1999 |
| JP | 2003221493 A | 8/2003 |
| WO | 9606881 A2 | 3/1996 |

OTHER PUBLICATIONS

International Search Report in PCT/US2004/027350 dated Dec. 15, 2004.  
Written Opinion in PCT/US2004/027350 dated Dec. 15, 2004.  
DuPont™ Hytrel® thermoplastic polyester elastomer product guide and properties (16 pages).  
English-language translation of a Japanese Patent Office communication dated Jun. 29, 2009 issued for counterpart Japanese Application No. 2006-526113 (2 pages).

*Primary Examiner* — Leo B Tentoni

(57) ABSTRACT

A method of laser sintering a thermoplastic composition to provide an article of manufacture having a plurality of sintered layers is disclosed. The thermoplastic composition has a relatively high melting point and a small particle size. The articles of manufacture have a high resolution and excellent durability and strength.

26 Claims, 1 Drawing Sheet

LASER SINTERING PROCESSES USING THERMOPLASTIC COMPOSITIONS

CROSS-REFERENCE TO RELATED APPLICATION

This is the U.S. national phase application of International Application No. PCT/US2004/027350, filed 20 Aug. 2004, which claims the benefit of U.S. provisional patent application No. 60/501,338, filed 8 Sep. 2003.

FIELD OF THE INVENTION

The present invention relates to thermoplastic compositions useful in laser sintering processes to form flexible articles of manufacture. The articles of manufacture are prepared at relatively high temperatures, and have excellent resolution, strength, and durability.

BACKGROUND OF THE INVENTION

Laser sintering is a process wherein an article of manufacture is built layer by layer. The laser-sintering technique is based on using a laser beam to selectively fuse a predetermined portion of a layer of particulate material. The particulate material contacted by the laser is heated to a temperature above its melting point, after which adjacent particles are fused together, as are adjacent layers of fused material.

Laser sintering generally is performed according to the following steps:

1. A piston of the process chamber is lowered by one layer thickness, and simultaneously, a piston of a cartridge containing the particulate material is raised;
2. A particulate material is introduced into the process chamber, and a leveling roller spreads the particulate material evenly over a build surface of the process chamber;
3. The particulate material is heated to a temperature near, but below, its softening point;
4. A laser beam then traces a predetermined cross section of the article on the layer of heated particulate material in the build surface, thus forming a solid layer; and
5. Steps 2 through 4 are repeated until the article is completed.

The particulate material in areas that have not been sintered by the laser remains unfused and in place, and acts as a natural support for the article being manufactured. Accordingly, no need exists for support structures during manufacture of the article. FIGS. 1 and 2 are schematics illustrating the laser-sintering process for the manufacture of an article having a complex shape. Clausen et al. U.S. Pat. No. 6,110,411, incorporated herein by reference, provides a detailed description of the selective layer sintering process, and also discloses laser-sinterable thermoplastic compositions for use in the process.

In particular, U.S. Pat. No. 6,110,411 is directed to thermoplastic compositions having a glass transition temperature ($T_g$) of not more than 50° C. that are useful in a selective laser sintering process. U.S. Pat. No. 6,110,411 particularly teaches a laser-sinterable composition containing a flow agent and a block copolymer thermoplastic resin having a glass transition temperature ($T_g$) of not more than 50° C. The low $T_g$ of the block copolymer permits a relatively low temperature laser sintering process that, according to U.S. Pat. No. 6,110,411, overcomes the problems of temperature control, distortion of the formed article, article inflexibility, and long cooling times associated with prior compositions, e.g., nylon-based compositions, that had to be heated to 170° C. to 190° C. prior to laser sintering. Such high process temperatures are considered disadvantageous because of poor sintering performance, especially poor temperature control, which leads to parts having poor physical properties and failing to meet specifications. U.S. Pat. No. 6,110,411 teaches compositions that are laser sinterable below 170° C. to 190° C., i.e., from room temperature to a temperature less than 150° C.

However, the compositions of U.S. Pat. No. 6,110,411 also have disadvantages. First, resolution of the article after manufacturer is substandard; with the article lacking crisp sharp features, such as edges. Second, the durability of articles manufactured from the low $T_g$ and low melting point block copolymer often is poor. The property of the compositions disclosed in U.S. Pat. No. 6,110,411 that allows a low process temperature and imparts enhanced flexibility to the articles, therefore also detracts from the long-term durability of the article.

Third, the density of the article typically is low. In particular, articles prepared by laser sintering a composition of U.S. Pat. No. 6,110,411 have a relatively high void volume, and, consequently, a relatively low volume density. Such articles typically have a volume density that is about 60% to about 80% of theoretical density. Therefore, the strength of the articles, especially thin articles, is low.

To improve the density and strength of an article of manufacture prepared using a low $T_g$ and low melting point block copolymer of U.S. Pat. No. 6,110,411, the article is subjected to an "infiltration" step wherein a liquid polymer, such as a polyurethane oligomer, is introduced into the voids of the article, then crosslinked. This infiltration step decreases the void volume of the article, increases article density, and strengthens the article, but adds an expensive and time-consuming step to the manufacturing process.

The present invention is directed to thermoplastic compositions that are laser sinterable and overcome the disadvantages associated with the compositions of U.S. Pat. No. 6,110,411 and other laser sinterable thermoplastic compositions.

BACKGROUND OF THE INVENTION

The present invention is directed to thermoplastic compositions useful in laser sintering processes. More particularly, the present invention is directed to a thermoplastic composition comprising a block copolymer having a relatively high melting point, and, in preferred embodiments, a high heat of fusion.

Accordingly, one aspect of the present invention is to provide a thermoplastic composition that can be laser sintered to yield flexible articles of manufacture having excellent resolution, durability, and strength.

Another aspect of the present invention is to provide a laser sinterable thermoplastic composition comprising a mixture of (a) one or more particulate thermoplastic block copolymer having a melting point of about 180° C. to about 210° C., and, in preferred embodiments, a high heat of fusion ($\Delta H_f$), and (b) an optional particulate flow agent. In preferred embodiments, the block copolymer has a recrystallization temperature that is about 40° C. to about 60° C. below its melting point.

A block copolymer included in the present composition contains a multiplicity of recurring segments characterized as soft (amorphous) and hard (crystalline) segments. These segments are joined head to tail randomly to form the block copolymer. The soft segment is selected from the group consisting of ether and ester monomer units, and the hard segment is selected from the group consisting of ester, amide, and urethane monomer units.

Still another aspect of the present invention is to provide a method of manufacturing an article of manufacture using laser sintering comprising the steps of (a) depositing a quantity of a thermoplastic composition of the present invention on a support surface;

(b) leveling the composition to form a smooth layer of the composition on the support surface;

(c) then directing an energy beam over a predetermined target area on the support surface causing the composition to form an integral layer; and (d) repeating steps (a) to (c) to form additional layers that are integrally bonded to adjacent layers to form a three-dimensional article.

Yet another aspect of the present invention is to manufacture an article by a laser sintering process having a sufficient volume density such that an infiltration step to increase article density and strength can be omitted.

These and other novel aspects and advantages of the present invention will become more apparent from the following detailed description of the preferred embodiments taken in conjunction with the figures.

DETAILED DESCRIPTION OF THE PREFERRED EMBODIMENTS

Figure 1:
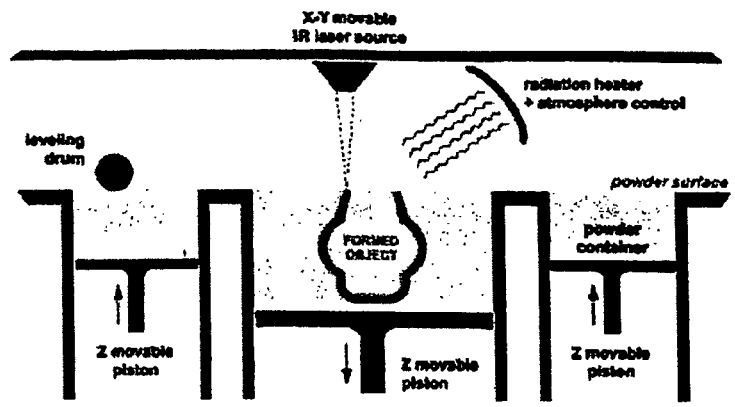
FIGS. 1 and 2 are schematics illustrating the laser sintering process.
Figure 2:
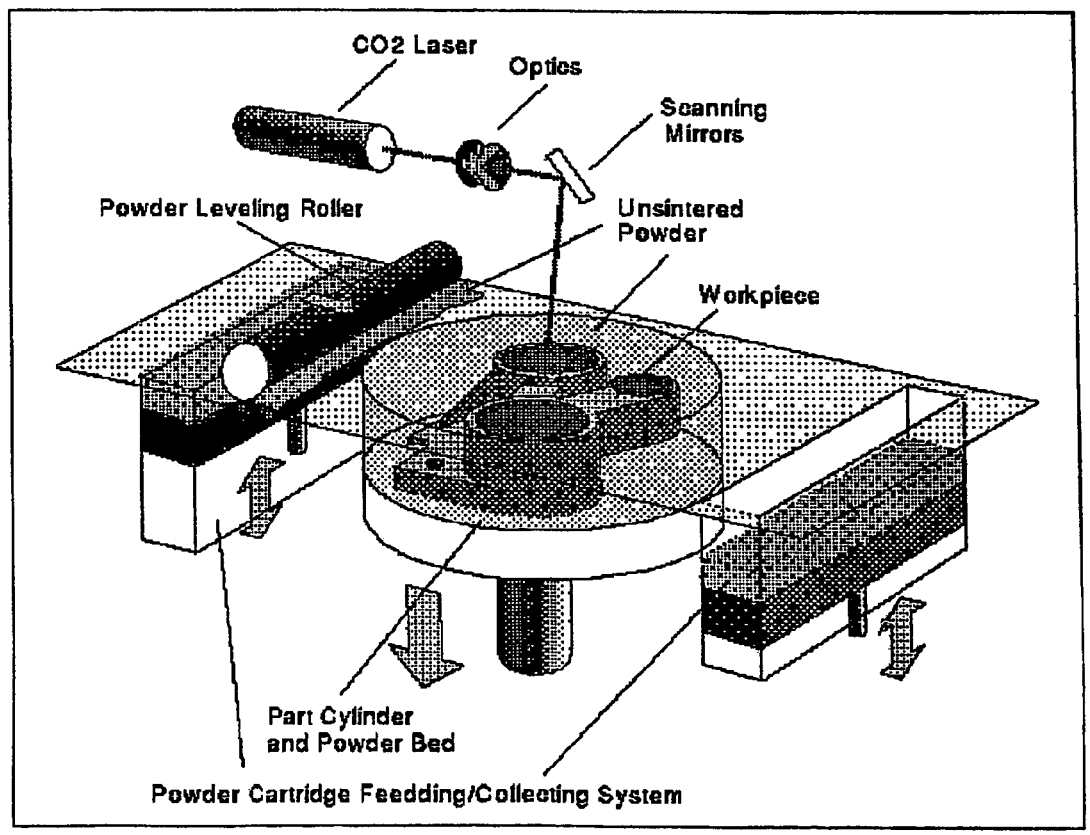

A thermoplastic composition of the present invention comprises a thermoplastic block copolymer having a melting point of about 180° C. to 210° C. More particularly, a thermoplastic composition of the present invention comprises: (a) about 90% to 100%, by weight, of a particulate thermoplastic block copolymer having a melting point of about 180° C. to about 210° C., and, in preferred embodiments, a high heat of fusion, and (b) about 0% to about 5%, by weight, of a particulate flow agent. The thermoplastic compositions also can comprise other optional ingredients, such as a coloring agent or a second modifying polymer, that do not adversely affect the thermoplastic composition or an article of manufacture prepared from the composition.

The major component of the thermoplastic composition is a particulate thermoplastic copolymer in an amount of about 90% to about 100%, and preferably about 95% to about 99.95%, by weight of the composition. To achieve the full advantage of the present invention, the thermoplastic composition contains about 97% to about 99.95%, by weight, of the thermoplastic block copolymer.

The particulate thermoplastic block copolymer contains discrete segments along the polymer chain characterized as soft and hard segments. These segments are bonded one to another, randomly, by condensation polymerization such that the head of one segment is joined to the tail of another segment.

The soft segment can be an ether or an ester, and is amorphous. The hard segment can be an ester, an amide, or a urethane, and is crystalline. The block copolymers useful in the present invention are represented by the following, non-limiting, combinations with the soft segment listed first: ether-ester, ester-ester, ether-amide, ester-amide, ether-urethane, ester-urethane, or mixtures of these combinations. The structures of these block copolymers are disclosed in U.S. Pat. Nos. 6,110,411; 3,561,014; 3,763,109; 3,766,146; 4,205,158; 4,544,734; 4,556,688; 3,784,520; and 3,044,987, each incorporated herein by reference.

A particulate thermoplastic block copolymer used in the present invention can be a single block copolymer or a mixture of block copolymers. However, each copolymer has a melting point of about 180° C. to about 210° C., and, preferably, a high $\Delta H_f$. In such a mixture of block copolymers, it is preferred that the melting points of the block copolymers are within 10° C., and more preferably 5° C., of one another.

Regardless of the chemical identity of the thermoplastic block copolymer, the copolymer has a melting point of about 180° C. to about 210° C., and preferably about 185° C. to about 205° C. To achieve the full advantage of the present invention, the thermoplastic block copolymer has a melting point of about 190° C. to about 200° C.

Preferably, the thermoplastic block copolymer also has a high heat of fusion ($\Delta H_f$) of about 15 to about 35, and more preferably about 17 to about 33, J/g (Joules/gram). To achieve the full advantage of the present invention, the block copolymer has a $\Delta H_f$ of about 20 to about 30 J/g.

The heat of fusion is the quantity of heat required to change one gram of a solid to a liquid, without a temperature change, at the melting point of the solid. A high $\Delta H_f$ allows the block copolymer to remain in the crystalline state when heated near its softening point prior to laser sintering. The particles of the block copolymer, therefore, resist softening and clumping, and do not fuse prematurely prior to laser sintering. As a result, the laser sintering process is facilitated and the resolution of the articles of manufacture is improved.

As discussed in more detail hereafter, a high melting thermoplastic block copolymer used in the present method provides a strong, durable article of manufacture having excellent resolution. These improvements are attributed, in part, to providing a more dense article of manufacture.

Examples of thermoplastic block copolymers that can be used in the present invention include copolymers sold under the tradenames HYTREL (E.I. duPont), SANIFLEX (Wilden), ECDEL (Eastman Chemicals), GAFLEX (Celanese), LOMOD (General Electric), ARNITEL (Dutch State Mines), PEBAX (Atochem), ESTANE (B.F. Goodrich), ESTAMID (Dow), RITEFLEX (Ticona GmbH), PELLATHANE (Dow Chemical), Q-THANE (K. J. Quinn), and TEXIN (Mobay). HYTREL and RITEFLEX, for example, are polyether-ester elastomers; ARNITEL is a polyester-ester elastomer, PEBAX is a polyetheramide elastomer, ESTANE is a polyether-urethane elastomer, ESTAMID is a polyester-amide; and TEXIN is a polyester-urethane.

Specific block copolymers useful in the present invention include, but are not limited to, HYTREL® Types 4069, 4556, 5526, 4059FG, G4778, G4774, 5555HS, and 6359FG, and RITEFLEX® Type 663. Especially preferred block copolymers useful in the present invention are HYTREL® 4068FG and RITEFLEX® 640.

HYTREL® 4068FG has a melting point of 193° C., a recrystallization point of about 140° C., and a $\Delta H_f$ of 25 J/g. HYTREL® 4068FG is a thermoplastic block copolymer having a hard (i.e., crystalline) segment of polybutylene phthalate and a soft (i.e., amorphous) segment based on a long chain polyalkylenether glycol.

In accordance with an important feature of the present invention, the particles of the thermoplastic block copolymer have a median particle size of about 40 to about 60 μm, a particle size range of about 1 to about 150 μm, and a particle size distribution (d90) of about 90 to about 100 μm. The term "d90 of about 90 to about 100 μm" is defined as 90% of the particles being smaller than about 90 to about 100 μm, and about 10% of the particles being greater than about 90 to about 100 μm. This small uniform particle size allows a more efficient fusion of block copolymer particles during laser sintering, and provides a more dense and stronger article of manufacture.

A thermoplastic composition of the present invention optionally contains a flow agent. In particular, a thermoplastic composition of the present invention contains 0%, preferably 0.05%, to about 5%, and more preferably about 0.075% to about 1%, by weight of a particulate flow agent. To achieve the full advantage of the present invention, the thermoplastic composition contains about 0.1% to about 0.25%, by weight, of the flow agent.

The optional flow agent included in the thermoplastic composition is a particulate inorganic material having a median particle size of 10 microns or less, and is selected from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate. The flow agent preferably is present in an amount sufficient to allow the thermoplastic block copolymer to flow and level on the build surface of the laser sintering device. The preferred flow agent is a fumed silica.

A present thermoplastic composition also can contain other optional ingredients. These optional ingredients are particulate materials and include organic and inorganic materials, such as fillers and coloring agents. An optional ingredient is present in a sufficient amount to perform its intended function, without adversely affecting the thermoplastic composition or an article prepared therefrom. Optional ingredients have a particle size in the range of the particle sizes of the block copolymer and/or optional flow agent. Each optional ingredient is milled, if necessary, to the desired median particle size and particle size distribution.

Each individual optional ingredient, if present at all, typically is present in the thermoplastic composition in an amount of about 0.1% to about 30%, by weight, of the composition. The total amount of optional ingredients in the thermoplastic composition ranges from 0% up to about 30%, by weight.

It is not necessary for an optional ingredient to melt during the laser sintering process. However, each optional ingredient must be compatible with the block copolymer in order to provide a strong and durable article of manufacture. The optional ingredient, therefore, can be inorganic, filler that imparts additional strength to the article of manufacture.

One optional ingredient is a coloring agent, for example a pigment or a dye, like carbon black, to impart a desired color to the article of manufacture. The coloring agent is not limited, as long as the coloring agent does not adversely affect the composition or an article prepared therefrom, and is sufficiently stable to retain its color under conditions of the laser sintering process and during exposure to the laser.

The optional ingredient also can be a second polymer that modifies the properties of the thermoplastic block copolymer. One useful second polymer is a nylon, such as nylon 6, nylon 66, nylon 11, nylon 610, nylon 12, nylon 612, copolymerized nylons, and mixtures thereof. Such nylon materials typically are laser sintered after heating to about 170° C. to about 190° C. Accordingly, the nylons melt near the range of a block copolymer included in a present composition, and the laser sintering process is facilitated. One nonlimiting example of a nylon that can be included in a thermoplastic composition of the present invention is the ELVAMIDE® line of nylon resins, available from DuPont Co., Wilmington, Del., for example, ELVAMIDE® 8061, a polyamide terpolymer of nylon 6, nylon 66, and nylon 610.

The present thermoplastic compositions are sinterable at relatively high temperatures, e.g., at a temperature slightly below the melting point of the block copolymer. Because of the relative high melting point of the block copolymer, and, preferably, the high $\Delta H_f$, thermal degradation of the block copolymer is essentially eliminated. Accordingly, a thermoplastic composition of the present invention can be laser sintered at a temperature of about 160° C. to about 210° C., depending upon the melting point of the block copolymers present in the thermoplastic composition. In preferred embodiments, a high $\Delta H_f$ of the block copolymer helps ensure that the copolymer particles do not soften, flow, and/or fuse prior to laser sintering.

Each ingredient of the thermoplastic composition is dry, i.e., contains a minimal amount of moisture, typically 2%, by weight, or less. All composition ingredients are milled or ground, if necessary, to provide the desired particle size. The composition ingredients then are blended, in any order, but typically by adding ingredients to the block copolymer, and admixed until a uniform composition containing discrete particles of each ingredient results. After admixture, the resulting composition is sieved to provide a desired particle size and particle size distribution.

The thermoplastic compositions of the present invention preferably are elastomeric and provide flexible articles of manufacture. However, because of the high melting point of the block copolymers present in the thermoplastic composition, and because of the particle size of the ingredients in the composition, the articles of manufacture resulting from the laser sintering process exhibit a durability and strength that substantially exceed the durability and strength of articles prepared using ah elastomeric composition of the prior art, for example, an elastomeric composition disclosed in U.S. Pat. No. 6,110,411.

It is theorized, but not relied upon herein, that the relatively high melting point block copolymer utilized in the present invention, assisted by the particle size of the block copolymer particles, and, preferably, high block copolymer $\Delta H_f$, provides a more stable thermoplastic composition after heating near its melting point prior to laser sintering. The heated composition remains crystalline, and melts and fuses after being subjected to laser sintering. These features are believed to improve the resolution, durability, and strength of the manufactured article.

Accordingly, an article of manufacture prepared by laser sintering a thermoplastic composition of the present invention has a volume density that is substantially equal to an article manufactured isotropically, e.g., molded, from the identical composition. As defined herein, the term "volume density substantially equal to" is defined as a density that is 80% to 95%, and preferably greater than 90%, of the volume density of an article manufactured isotropically using an identical composition.

Due to the high volume density and low void density of an article prepared by laser sintering a composition of the present invention, the strength of the article is sufficient such that an infiltration step can be eliminated. Articles made by laser sintering a composition of U.S. Pat. No. 6,110,411 have a relatively low volume density, and, accordingly, a relatively high void density. The relatively porous article therefore lacks strength, and an infiltration step is necessary to fill the voids and impart strength to the article. The present composition overcomes the need of an infiltration step.

The thermoplastic compositions of the present invention are laser sintered by heating a layer of the composition present on the build surface of a process chamber to a temperature slightly below the softening point ($T_s$) of the block copolymer, e.g., within about 10° C. of the softening point of the block copolymer. By directing a laser at a predetermined portion of the build surface, the thermoplastic composition is heated above the melting point of the block copolymer, the particles of the thermoplastic composition in the layer then fuse together, and the layer fuses to an adjacent, previously fused layer. After a layer-by-layer manufacture of an article of manufacture, the article exhibits excellent resolution, durability, and strength.

The following examples illustrate the unexpected benefits provided by laser sintering a thermoplastic composition of the present invention. All tests were performed using the composition of Example 1.

Example 1

HYTREL® 4068FG, a polyether-ester elastomer, available from E.I. duPont de Nemours, Inc. of Wilmington, Del., as quarter-inch diameter, cylindrical pellets, was milled under liquid nitrogen in an attrition mill and screened to a particle size having a d90 of 94 microns.

The milled HYTREL® 4068FG was admixed with fumed silica, e.g., Cab-o-Sil PS 530 fumed silica (flow agent), available from Cabot Corporation, Inc., Tuscola, Ill., to provide a thermoplastic composition containing 99.9%, by weight, HYTREL® 4068FG and 0.1%, by weight, fumed silica.

This thermoplastic composition was applied to a build surface of a selective laser sintering apparatus, i.e., a VANGUARD™ HS selective laser sintering system, from 3D Systems, Valencia, Calif. The layer of the thermoplastic composition had a thickness of about 100 to about 200 microns.

After the thermoplastic composition was leveled to form a smooth surface, the composition was heated to about 180° C. to about 190° C. (i.e., slightly below the softening point of the block copolymer), then exposed to radiation from a 25 watt carbon dioxide laser. The laser beam was controlled by computer such that laser beam movement scanned an area of about 6.45 square centimeters.

The energy of the laser was held constant at 25 watts, but the intensity of the exposure was controlled by varying the scan rate from between 1 m/sec to 2 m/sec. Before each pass of the laser, a layer of powdered polymer was deposited over the build surface such that the new layer of thermoplastic composition was about 150 microns. The laser line spacing was 0.20 mm. Each pass of the laser caused the thermoplastic composition to fuse and produce a solid layer. With successive passes of the laser beam, the newly formed layer is fused to the layer formed during the previous pass. After ten such passes, a rectangular solid article was formed having a thickness of about 0.15 cm and faces of 6.45 cm². The formed article then was cooled. The article was flexible and could be deformed by pressure supplied by hand. Once the pressure was relaxed, the article returned to its original shape.

Any residual powdered polymer clinging to the surface of the article was removed by shaking the article or brushing its surface. The thermoplastic composition was fused into articles using a wide range of laser intensities, and in all cases the articles had good physical integrity and could not be divided into separate layers by pulling or other types of deformations with force applied directly by hand.

Example 2

The thermoplastic composition of Example 1 also was used to manufacture complex articles of manufacture using the VANGUARD™ HS system. The composition of Example 1 provided flexible articles having excellent strength and hardness. In this test, the thermoplastic composition of Example 1 was heated to about 100° C. to about 120° C. prior to laser sintering. The part bed temperature and feed temperature settings were varied as illustrated in the following table. The first article of manufacture, i.e., hearing aid shells, provided articles of excellent resolution. In additional tests, the part bed temperature setting was reduced by about 5° C., which resulted in improved articles.

| Process Parameter | First Run | Second Run |
|---|---|---|
| Roller speed | 3 inch/second | 12 inch/second |
| Part bed temp. setting | 120° C. | 100° C. |
| Feed bed temp. setting | 100° C. | 100° C. |
| Laser fill scans | 1 | 2 |
| Part bed ramp | 0° C./inch | 5° C./inch |
| Warm-up height | 0.5 inch | 0.1 inch |
| Cool down time | Overnight | As fast as possible |

During the first run, the buildability of the composition was good. Composition rollout (i.e., leveling) was good, but slightly clumpy in front of the roller. The increased roller speed in the second run eliminated clumping.

The laser power during one pass causes the composition to smoke, which indicates that the laser power is sufficiently high. Increasing the number of laser scans did not adversely affect the article, and helped eliminate delamination of layers.

Melt flow data was collected for the composition of Example 1 using the latest melt flow procedure of drying and using a heavy weight. The melt flow index was about 38 grams/minute for a composition subjected to laser sintering one time. The strength of the manufactured articles was tested on a durometer and exhibited a strength of about 54 Shore A.

Overall, the composition of Example 1 was easy to process, and the composition outside of the sintering zone had good recyclability. The unsintered composition was completely broken up by hand, resifted, and reused without noticeable adverse effects. A number of different articles of manufacture were constructed successfully, including hearing aids, tubes, bellows, and a spider.

The thermoplastic composition of Example 1 also was compared to a commercial composition incorporating a low melting point block copolymer and flow agent, as disclosed in U.S. Pat. No. 6,110,411. The following table shows that a composition of Example 1 has an improved tear strength and elongation at break, and a comparable Shore A Hardness, for both uninfiltrated and infiltrated sintered articles. The infiltrant in both cases was a polyurethane.

Surprisingly, the data shows that the uninfiltrated article prepared from a composition of the present invention had a greater tear strength and greater elongation at break than an infiltrated article prepared from the same composition. Accordingly, an article of manufacture prepared from a composition of the present invention by laser sintering does not require an infiltration step to improve the properties of the articles. In preferred embodiments of the present invention, an infiltration step is avoided.

| | Example 1 | | Comparative Composition | |
|---|---|---|---|---|
| | Uninfiltrated | Infiltrated | Uninfiltrated | Infiltrated |
| Tear strength | 2.71 N/mm² | 2.43 N/mm² | 1.02 N/mm² | 1.15 N/mm² |
| Elongation at break | 170% | 155% | 115% | 60% |
| Shore A Hardness | 55–65 | 55–75 | 75 | 75 |

What is claimed is:

1. A method of manufacturing an article comprising laser sintering a thermoplastic composition comprising a thermoplastic block copolymer having a melting point of about 180° C. to 195° C.

2. The method of claim 1 wherein the thermoplastic composition comprises at least 90%, by weight, of the thermoplastic copolymer.

3. The method of claim 1 wherein the thermoplastic composition comprises at least 95%, by weight, of the thermoplastic copolymer.

4. The method of claim 1 wherein the block copolymer comprises soft and hard segments.

5. The method of claim 4 wherein the soft segment comprises an ether or an ester.

6. The method of claim 4 wherein the hard segment comprises an ester, amide, or urethane.

7. The method of claim 1 wherein the block copolymer has a melting point of about 185° C. to 195° C.

8. The method of claim 1 wherein the block copolymer has a melting point of about 190° C. to 195° C.

9. The method of claim 1 wherein the block copolymer has a d90 of about 90 to about 100 μm.

10. The method of claim 9 wherein the block copolymer has a median particle size of about 40 to about 60 μm.

11. The method of claim 10 wherein the block copolymer has a particle size range of about 1 to about 150 μm.

12. The method of claim 1 wherein the block copolymer has a heat of fusion of about 15 to about 35 Joules/gram.

13. The method of claim 1 wherein the block copolymer comprises a polyether-ester elastomer.

14. The method of claim 13 wherein the polyether elastomer comprises polybutylene phthalate segments and long-chain polyalkylenether glycol segments.

15. The method of claim 1 wherein thermoplastic composition further comprises a flow agent in an amount of about 0.05% to about 5%, by weight, of the composition.

16. The method of claim 15 wherein the flow agent has a median particle size of about 10 microns or less.

17. The method of claim 15 wherein the flow agent is selected from the group consisting of hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate, and mixtures thereof.

18. The method of claim 15 wherein the flow agent comprises a fumed silica.

19. The method of claim 1 wherein the thermoplastic composition comprises about 0.1% to about 30%, by weight, in total, of an optional ingredient selected from the group consisting of a coloring agent, a filler, a second modifying polymer, and mixtures thereof.

20. The method of claim 19 wherein the coloring agent comprises carbon black.

21. The method of claim 19 wherein the second modifying polymer comprises a polyamide.

22. The method of claim 21 wherein the polyamide is selected from the group consisting of nylon 6, nylon 66, nylon 11, nylon 610, nylon 12, nylon 612, a copolymerized nylon, and mixtures thereof.

23. The method of claim 15 wherein the thermoplastic block copolymer comprises a polyether-ester elastomer and the flow agent comprises a fumed silica.

24. The method of claim 23 wherein the thermoplastic composition further comprises about 0.1% to about 30%, by weight, of a polyamide.

25. A method of manufacturing an article comprising the steps of
(a) depositing a quantity of a thermoplastic composition on a support surface;
(b) leveling the composition to form a smooth layer of the composition on the support surface;
(c) then directing an energy beam over a predetermined target area on the support surface causing the composition to form an integral layer; and
(d) repeating steps (a) to (c) to form additional layers that are integrally bonded to adjacent layers to form a three-dimensional article,
wherein the thermoplastic composition comprises a thermoplastic composition comprising a thermoplastic block copolymer having a melting point of about 180° C. to 195° C.

26. The method of claim 25 wherein the article is free of an infiltration step performed after step (d).

* * * * *